United States Patent
Saitoh et al.

(10) Patent No.: US 11,016,230 B2
(45) Date of Patent: May 25, 2021

(54) OPTICAL ELEMENT AND OPTICAL DEVICE

(71) Applicant: FUJIFILM Corporation, Tokyo (JP)

(72) Inventors: Yukito Saitoh, Kanagawa (JP); Hiroshi Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/685,098

(22) Filed: Nov. 15, 2019

(65) Prior Publication Data

US 2020/0081170 A1    Mar. 12, 2020

Related U.S. Application Data

(63) Continuation of application No. PCT/JP2018/019390, filed on May 18, 2018.

(30) Foreign Application Priority Data

May 19, 2017    (JP) .............................. JP2017-100265

(51) Int. Cl.
*G02B 5/30* (2006.01)
*F21V 8/00* (2006.01)

(52) U.S. Cl.
CPC ........... *G02B 5/3016* (2013.01); *G02B 6/005* (2013.01)

(58) Field of Classification Search
CPC .............................. G02B 5/3016; G02B 6/005
(Continued)

(56) References Cited

U.S. PATENT DOCUMENTS

| 10,386,558 B2 | 8/2019 | Escuti et al. |
| 2004/0252259 A1 | 12/2004 | Schadt et al. |

(Continued)

FOREIGN PATENT DOCUMENTS

| JP | 2000-249835 A | 9/2000 |
| JP | 2001-525080 A | 12/2001 |

(Continued)

OTHER PUBLICATIONS

International Preliminary Report on Patentability and Written Opinion of the International Searching Authority(Forms PCT/IB/326, PCT/IB/373 and PCT/ISA/237), dated Nov. 28, 2019, for International Application No. PCT/JP2018/019390, with an English Translation.

International Search Report (Form PCT/ISA/210), dated Jul. 24, 2018, for International Application No. PCT/JP2018/019390, with an English translation.

(Continued)

*Primary Examiner* — Nathanael R Briggs
*Assistant Examiner* — William D Peterson
(74) *Attorney, Agent, or Firm* — Birch, Stewart, Kolasch & Birch, LLP

(57) ABSTRACT

Provided is an optical element including a wavelength selective reflective polarizer and a λ/2 plate in which the λ/2 plate includes an optically anisotropic layer which has an optical axis in a direction parallel to a surface and is formed of a cured layer of a liquid crystal composition and has a liquid crystal alignment pattern in which an orientation of the optical axis changes while continuously rotating in at least one direction in a plane of the optically anisotropic layer, and light in the specific wavelength range which is circularly polarized light oriented in a direction opposite to that of the specific circularly polarized light among light incident on a surface of the optical element on the λ/2 plate side is reflected in a direction different from a regular reflection direction of the incident light.

8 Claims, 5 Drawing Sheets

(58) Field of Classification Search
USPC .......................................................... 349/194
See application file for complete search history.

(56) References Cited

U.S. PATENT DOCUMENTS

| | | | |
|---|---|---|---|
| 2008/0280107 A1* | 11/2008 | Katschorek | B42D 25/328 |
| | | | 428/172 |
| 2012/0086903 A1 | 4/2012 | Escuti et al. | |
| 2016/0011353 A1* | 1/2016 | Escuti | G02B 6/105 |
| | | | 359/15 |
| 2018/0157068 A1 | 6/2018 | Yanai et al. | |

FOREIGN PATENT DOCUMENTS

| | | |
|---|---|---|
| JP | 2007-532959 A | 11/2007 |
| JP | 2008-532085 A | 8/2008 |
| JP | 2008-268724 A | 11/2008 |
| JP | 2014-174468 A | 9/2014 |
| JP | 2016-004487 A | 1/2016 |
| JP | 2016-519327 A | 6/2016 |
| WO | WO 2017/022592 A1 | 2/2017 |

OTHER PUBLICATIONS

Japanese Office Action for corresponding Japanese Application No. 2019-518900, dated Apr. 28, 2020, with English machine translation.
Japanese Office Action for corresponding Japanese Application No. 2019-518900, dated Dec. 8, 2020, with English translation.

* cited by examiner

OPTICAL ELEMENT AND OPTICAL DEVICE

CROSS-REFERENCE TO RELATED APPLICATIONS

This application is a continuation application of International Application No. PCT/JP2018/019390, filed May 18, 2018, the disclosure of which is incorporated herein by reference in its entirety. Further, this application claims priority from Japanese Patent Application No. 2017-100265, filed May 19, 2017, the disclosure of which is incorporated herein by reference in its entirety.

BACKGROUND OF THE INVENTION

1. Field of the Invention

The present disclosure relates to an optical element which is capable of controlling the reflection direction of incident light and an optical device comprising the optical element.

2. Description of the Related Art

Since polarized light has been used in various optical devices or systems, there is a demand for an optical element for controlling reflection, focusing, and divergence of polarized light.

JP2008-268724A (hereinafter, also referred to as Patent Document 1) suggests a reflection diffraction polarizer which comprises an uneven diffraction grating structure on a surface of a cholesteric liquid crystal layer. JP2008-268724A describes that a high reflectivity and low reflection zero-order diffraction efficiency are obtained in a case where specific circularly polarized light is incident on this reflection diffraction grating in parallel with a helix axis of a cholesteric liquid crystal phase.

In addition, JP2008-532085A (hereinafter, also referred to as Patent Document 2) discloses a polarization diffraction grating obtained by aligning liquid crystals in an anisotropic alignment pattern corresponding to a polarization hologram. JP2008-532085A describes an example in which the alignment direction of the anisotropic alignment pattern is periodic along at least one straight line in the plane of an alignment layer. Further, JP2016-519327A (hereinafter, also referred to as Patent Document 3) discloses a polarization conversion system that uses a geometric phase difference hologram comprising an anisotropic alignment pattern similar to JP2008-532085A.

SUMMARY OF THE INVENTION

It is not easy to prepare a cholesteric liquid crystal comprising an uneven surface as in the reflection diffraction grating of JP2008-268724A. Further, zero-order reflection of reflected light is suppressed, but the direction of the reflected light is not controlled. Therefore, reflection in a desired direction is not intended.

An object of the present disclosure is to provide an optical element which is capable of reflecting incident light in a desired direction different from the direction of regular reflection and an optical device comprising the optical element.

An optical element according to the present disclosure, comprising: a wavelength selective reflective polarizer which selectively reflects specific circularly polarized light that is light in a specific wavelength range; and a λ/2 plate which is disposed on at least one surface side of the wavelength selective reflective polarizer, in which the λ/2 plate includes an optically anisotropic layer which has an optical axis in a direction parallel to a surface and is formed of a cured layer of a liquid crystal composition and has a liquid crystal alignment pattern in which an orientation of the optical axis changes while continuously rotating in at least one direction in a plane of the optically anisotropic layer, and light in the specific wavelength range which is circularly polarized light oriented in a direction opposite to that of the specific circularly polarized light among light incident on a surface of the optical element on the λ/2 plate side is reflected in a direction different from a regular reflection direction of the incident light.

In the optical element according to the present disclosure, it is preferable that a 180° rotation pitch of the orientation of the optical axis of the λ/2 plate in the one direction is 45 μm or less.

In the optical element according to the present disclosure, it is preferable that the wavelength selective reflective polarizer comprises a cholesteric liquid crystal layer.

Here, it is preferable that the cholesteric liquid crystal layer is formed of a cured layer of a polymerizable liquid crystal composition containing a rod-like liquid crystal compound.

In the optical element according to the present disclosure, it is preferable that the liquid crystal alignment pattern in the λ/2 plate is formed by aligning rod-like liquid crystals in a pattern form.

An optical device according to the present disclosure comprises the optical element according to the present disclosure; and a light source which allows light to be incident on the λ/2 plate side of the optical element.

The optical element according to the present disclosure comprises a wavelength selective reflective polarizer which selectively reflects specific circularly polarized light that is light in a specific wavelength range, and a λ/2 plate which is disposed on at least one surface side of the wavelength selective reflective polarizer, in which the λ/2 plate includes an optically anisotropic layer which has an optical axis in a direction parallel to a surface and is formed of a cured layer of a liquid crystal composition and has a liquid crystal alignment pattern in which an orientation of the optical axis changes while continuously rotating in at least one direction in a plane of the optically anisotropic layer, and light in the specific wavelength range which is circularly polarized light oriented in a direction opposite to that of the specific circularly polarized light among light incident on a surface of the optical element on the λ/2 plate side is reflected in a direction different from a regular reflection direction of the incident light. At this time, the light in the specific wavelength range which is circularly polarized light oriented in a direction opposite to that of the specific circularly polarized light can be reflected at a desired angle by appropriately setting the 180° rotation pitch of the orientation of the optical axis.

DESCRIPTION OF THE PREFERRED EMBODIMENTS

Hereinafter, embodiments of an optical element of the present invention will be described with reference to the accompanying drawings. Further, in each drawing, the scales of constituent elements are changed from the actual scales as appropriate in order to facilitate visual recognition. Further, the numerical ranges showing using "to" in the present specification indicate ranges including numerical values described before and after "to" as the lower limits and the upper limits. In regard to the angles, the terms "orthogonal" and "parallel" indicate a range of a strict angle±10°.

Figure 1:
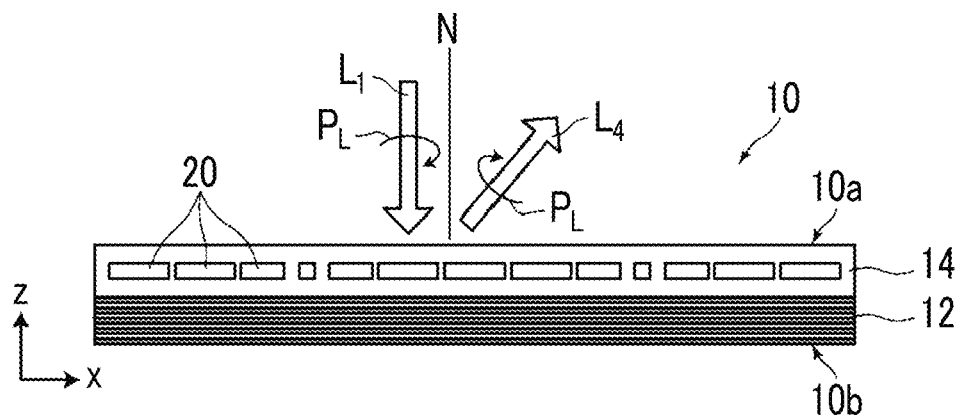
FIG. 1 is a schematic view illustrating a side surface of an optical element according to a first embodiment.
Figure 2:
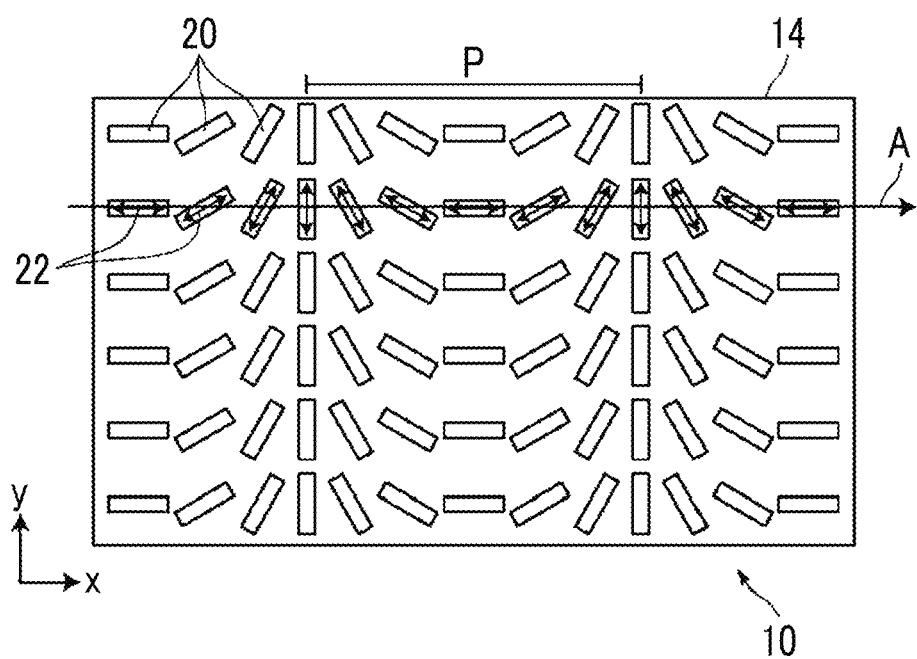
FIG. 2 is a schematic view illustrating a flat surface of the optical element according to the first embodiment.

FIG. 1 is a schematic view illustrating the configuration of a side surface an optical element 10 according to a first embodiment of the present invention, and FIG. 2 is a schematic view illustrating a flat surface of a λ/2 plate 14 of the optical element 10 illustrated in FIG. 1 in a liquid crystal alignment pattern. In the drawings, a sheet surface of the sheet-like optical element 10 is defined as an x-y surface, and the thickness direction is defined as a z direction.

The optical element 10 according to the present embodiment includes a wavelength selective reflective polarizer 12 (hereinafter, also referred to as a "reflective polarizer 12") formed of a cholesteric liquid crystal layer and the λ/2 plate 14 comprised on at least one surface side of the reflective polarizer 12.

The reflective polarizer 12 selectively reflects specific circularly polarized light that is light in a specific wavelength range. The reflective polarizer 12 comprises a cholesteric liquid crystal layer formed by fixing a cholesteric phase in which a rod-like liquid crystal compound or a disk-like liquid crystal compound is helically aligned. Hereinafter, in the present embodiment, the description of the reflective polarizer 12 will be made as being formed of a cholesteric liquid crystal layer. In the present embodiment, the description of the reflective polarizer 12 will be made as reflecting right circularly polarized light, but specific circularly polarized light reflected by the reflective polarizer 12 may be set depending on the applications thereof, and the reflective polarizer 12 reflects any one of right circularly polarized light or left circularly polarized light. Similarly, the color of the light in a specific wavelength range, which is selectively reflected by the reflective polarizer 12, may be appropriately selected from blue, green, and red depending on the applications thereof. The specific circularly polarized light to be reflected and the reflection wavelength range can be appropriately set by adjusting the refractive index of the liquid crystal layer and the helical pitch of the cholesteric phase during preparation of the cholesteric liquid crystal layer.

The λ/2 plate 14 in the present optical element further comprises functions as a typical λ/2 plate, in other words, a function of controlling the wave surface using the following configuration in addition to a function of imparting a phase difference of 180° (=π=λ/2) between linear polarization components in which incident light is orthogonal.

The λ/2 plate 14 comprises an optically anisotropic layer formed of a cured layer of a liquid crystal composition. In the present embodiment, the λ/2 plate 14 is formed of an optically anisotropic layer. The optically anisotropic layer has a liquid crystal alignment pattern in which the orientation of an optical axis 22 changes while continuously rotating in at least one direction in the plane thereof. In the present application, the liquid crystal compounds forming the λ/2 plate are divided into the "rod-like liquid crystal" and the "disk-like liquid crystal" as necessary in order to distinguish liquid crystals from those used for the reflective polarizer. FIG. 1 and FIG. 2 each schematically illustrate a liquid crystal alignment pattern in which a major axis of a rod-like liquid crystal 20 changes while rotating in one direction in the plane. The major axis of the rod-like liquid crystal 20 is an optical axis 22 in the rod-like liquid crystal 20, and the rotation of the major axis of the rod-like liquid crystal 20 has the same definition as the rotation of the optical axis of the rod-like liquid crystal 20.

As illustrated in FIG. 1 and FIG. 2, in the λ/2 plate 14 of the optical element 10 according to the present embodiment, the optical axis 22 of the rod-like liquid crystal 20 is aligned in parallel with the surface of the λ/2 plate 14 and is fixed in an alignment pattern that changes while continuously rotating in at least one direction (axis A) of the plane. The expression of "the orientation of the optical axis 22 changes while continuously rotating in one direction" means that the angle between the axis A and the optical axis 22 of the rod-like liquid crystal 20 disposed along the axis A varies depending on the position of the axis A direction, and the angle between the axis A and the optical axis 22 along the axis A gradually changed from θ to θ+180° or θ−180°. Here, as illustrated in FIGS. 1 and 2, the gradual change may be made by adjacent regions at a constant angle such as 30° rotating from 0° to 180° (=0°) and may not be completely continuous. The change is gradual in a case where the average value of the unit range linearly changed at a constant rate. Here, a change in inclination of the optical axis in regions which are adjacent to each other in the axis A direction and have different inclinations is 45° or less. However, it is preferable that the change in inclination of regions adjacent to each other is smaller.

In the A axis direction, a distance where the angle θ between the optical axis 22 and the A axis is changed to θ+180° or θ−180° (returning to the original) is the 180° rotation pitch P. The 180° rotation pitch P of the orientation of this optical axis is less than or equal to the pitch of the diffraction grating for visual light. Specifically, the 180° rotation pitch P is preferably 45 μm or less, more preferably 10 μm or less, and particularly preferably 5 μm or less. Further, the 180° rotation pitch P may be determined according to a desired reflection direction with respect to the incident light to be incident on the optical element.

With the configuration comprising the reflective polarizer 12 and the λ/2 plate 14, the optical element 10 reflects the light in a specific wavelength range that is circularly polarized light oriented in a direction opposite to that of the specific circularly polarized light among light incident on the surface of the optical element on the λ/2 plate 14 side in a direction different from the regular reflection direction. For example, in a case where the reflective polarizer 12 reflects right circularly polarized light $P_R$ that is light in a wavelength range of a green color, as illustrated in FIG. 1, light $L_1$ (hereinafter, referred to as incident light $L_1$) of left circularly polarized light $P_L$ is incident in a direction (hereinafter, referred to as the normal direction) parallel to the normal line of the surface of the optical element 10, and green light $L_4$ (hereinafter, referred to as reflected light $L_4$) of the left circularly polarized light $P_L$ is reflected in a direction different from the normal direction. The optical element 10 is capable of reflecting light in a direction with a large inclination with respect to the regular reflection direction as the above-described 180° rotation pitch in the λ/2 plate 14 decreases.

Figure 3:
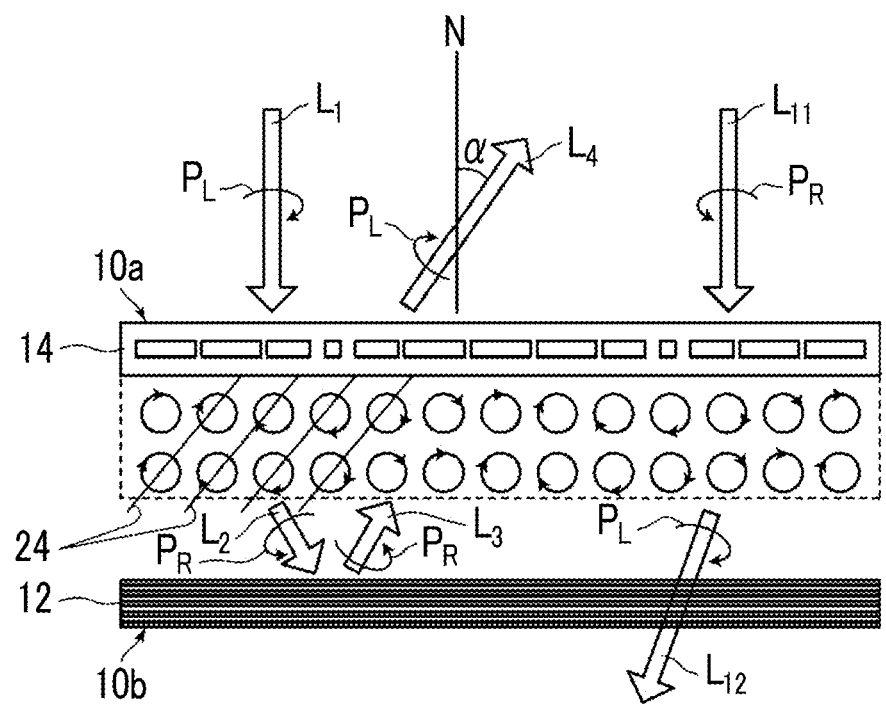
FIG. 3 is a view for describing the principle of generation of reflected light in a direction different from a regular reflection direction in the optical element.

FIG. 3 is a view schematically showing the principle of reflection of incident light $L_1$ which has been incident on the optical element 10 in a direction different from the regular reflection direction of the incident light $L_1$ as reflected light $L_4$. Hereinafter, the description will be made with reference to FIG. 3.

In a case where the incident light $L_1$ that is left circularly polarized light $P_L$ passes through the λ/2 plate 14, a phase difference of λ/2 is imparted so that the incident light is converted to right circularly polarized light $P_R$. In the λ/2 plate 14, the absolute phase of the incident light $L_1$ is changed due to the optical axis 22 of the rod-like liquid crystal 20 in each region of the plane. At this time, since the orientation of the optical axis 22 of the rod-like liquid crystal 20 changed due to rotation in the A axis direction (the x axis direction in the present example), the amount of change in absolute phase varies depending on the orientation of the optical axis 22 of the rod-like liquid crystal 20 in the x coordinate of the surface (x-y surface) of the λ/2 plate 14 on which incident light is incident. In the region indicated by the broken line in FIG. 3, a state in which the amount of change in absolute phase varies depending on the x coordinate is schematically illustrated. As illustrated in FIG. 3, an equiphase surface 24 of the absolute phase with an angle with respect to the surface of the λ/2 plate is formed due to deviation of the absolute phase during the light passing through the λ/2 plate 14. In this manner, a bending force is applied to the incident light $L_1$ which has been incident along the direction parallel to the normal line N in a direction perpendicular to the equiphase surface 24 so that the traveling direction of the incident light $L_1$ is changed. In other words, the incident light $L_1$ is turned into right circularly polarized light $P_R$ after passing through the λ/2 plate 14 and then turned into light $L_2$ proceeding in a direction having an angle in the normal direction. In addition, the light $L_2$ is incident at a predetermined angle obliquely with respect to the reflective polarizer 12.

Light in a specific wavelength range (for example, green light) among the light $L_2$ that is right circularly polarized light $P_R$ which has been incident on the reflective polarizer 12 is regularly reflected. In other words, the light $L_2$ which has been incident on the reflective polarizer 12 is turned into reflected light $L_3$ that is green light in which the right circularly polarized light $P_R$ is maintained. In a case where the reflected light $L_3$ passes through the λ/2 plate 14, a phase difference of λ/2 is imparted so that the reflected light $L_3$ is converted to left circularly polarized light $P_L$. Similar to the light incidence, the traveling direction is changed in a direction where the inclination becomes larger from the normal direction due to a bending force being applied, similar to the light incidence, by the equiphase surface 24 formed due to the deviation of the amount of change in absolute phase according to the orientation of the optical axis 22 of the rod-like liquid crystal 20. Therefore, the light is emitted from a surface (the surface of the optical element 10) 10a of the optical element on the λ/2 plate 14 side as reflected light $L_4$.

As described above, in the optical element 10, the incident light $L_1$ which has been incident from the normal line N with respect to the surface of the optical element 10 is reflected as the reflected light $L_4$ in a direction different from the normal direction.

At this time, the inclination of the reflected light with respect to the regular reflection direction can be changed by changing the 180° rotation pitch of the orientation of the optical axis in the liquid crystal alignment pattern of the λ/2 plate 14. Since a strong bending force can be applied to incident light as the 180° rotation pitch decreases, the inclination can be increased.

As described above, the wave surface of the incident light can be changed by changing the amount of change in absolute phase using the liquid crystal alignment pattern of the λ/2 plate 14.

In addition, in a case where the right circularly polarized light $P_R$ is incident on the optical element 10 as incident light $L_{11}$, the light is converted to left circularly polarized light $P_L$ in the λ/2 plate 14 and turned into light $L_{12}$ in which the traveling direction is changed due to a bending force applied in a direction opposite to the direction of the bending force applied to the incident light $L_1$ of the left circularly polarized light $P_L$. Further, since the light $L_{12}$ is left circularly polarized light $P_L$, the light is transmitted through the reflective polarizer 12 and then emitted from a surface (the rear surface of the optical element 10) 10b of the optical element 10 on the reflective polarizer 12 side.

Figure 4:
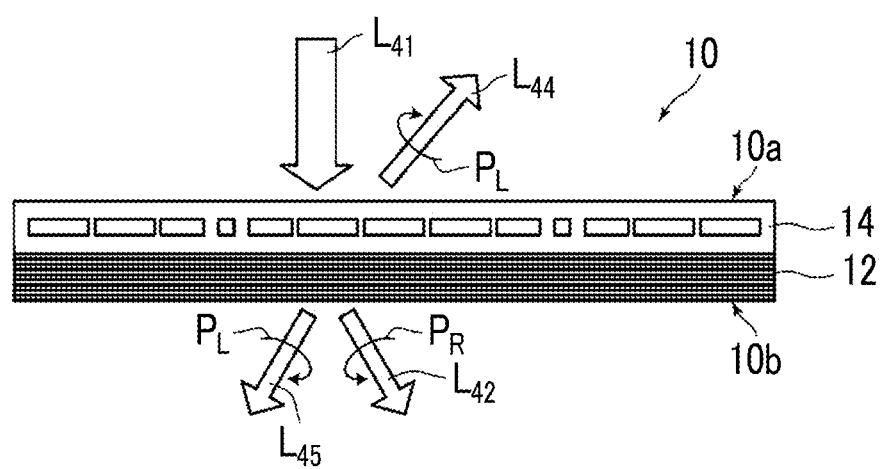
FIG. 4 is a view illustrating reflected light and transmitted light in a case where randomly polarized incident light is incident on the optical element according to the first embodiment.

As illustrated in FIG. 4, in a case where white incident light $L_{41}$ that is randomly polarized light is allowed to be incident on the optical element 10, light in a specific wavelength range and left circularly polarized light $P_L$ that is circularly polarized light opposite to the right circularly polarized light to be selectively reflected by the reflective polarizer 12 among the light $L_{41}$ is reflected in a direction different from the regular reflection direction of the incident light $L_{41}$ as reflected light $L_{44}$. Further, light which is left circularly polarized light $P_L$ in a range other than the specific wavelength range among the incident light $L_{41}$ is converted to right circularly polarized light $P_R$ in the λ/2 plate 14, transmitted through the reflective polarizer 12 in a state in which the traveling direction has been changed by the bending force being applied due to the liquid crystal alignment pattern, and emitted from the rear surface 10b of the optical element 10 as first transmitted light $L_{42}$. The right circularly polarized light $P_R$ among the incident light $L_{41}$ is converted to left circularly polarized light $P_L$ in the λ/2 plate 14, transmitted through the reflective polarizer 12 in a state in which the traveling direction has been changed by the bending force being applied in a direction opposite to the direction in which the bending force is applied to light converted to right circularly polarized light from left circularly polarized light, and emitted from the rear surface 10b of the optical element 10 as second transmitted light $L_{45}$. Further, the traveling direction of the first transmitted light $L_{42}$ and the traveling direction of the second transmitted light $L_{45}$ are line symmetric with respect to the traveling direction of the incident light $L_{41}$.

Figure 5:
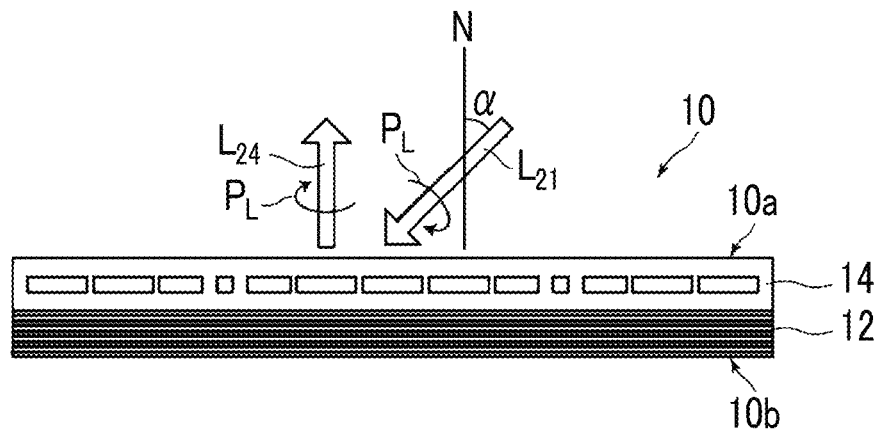
FIG. 5 is a view illustrating a state of the reflected light in a case where the incident light is obliquely incident on the optical element according to the first embodiment.

As illustrated in FIG. 5, in a case where incident light $L_{21}$ that is left circularly polarized light $P_L$ is allowed to be incident on the optical element 10 at an incident angle α which is the same as the angle α between reflected light $L_4$ and the normal line in FIG. 3, reflected light $L_{24}$ to be reflected in the normal direction N can be obtained by following the reverse of the optical path described in FIG. 3.

In the optical element according to the embodiment of the present invention, the 180° rotation pitch in the λ/2 plate is not necessarily uniform over the entire surface thereof. Further, the optical element may have a part of the liquid crystal alignment pattern in which the orientation of the optical axis rotates in at least one direction (axis A) in the plane of the λ/2 plate and may comprise a portion in which the orientation of the optical axis is constant.

As in the λ/2 plate 14 of the optical element 10 illustrated in FIG. 1 and FIG. 2, in a case where the liquid crystal alignment pattern in which the optical axis parallel to the surface is changed while rotating with a constant 1800 rotation pitch in one direction of the plane is uniformly comprised in the plane, the reflection direction is determined as one direction. Further, in which the optical element comprises a liquid crystal alignment pattern having a plurality of different 180° rotation pitches in one direction of the plane, incident light can be allowed to be reflected in a plurality of reflection directions according to the rotation pitches included in the liquid crystal alignment pattern. Further, in the liquid crystal alignment pattern, the direction in which the optical axis rotates and changes is not limited to one direction and may be two directions or a plurality of directions. By using a λ/2 plate comprising a liquid crystal alignment pattern according to the orientation of desired reflected light, incident light can be reflected in a desired direction.

Figure 6:
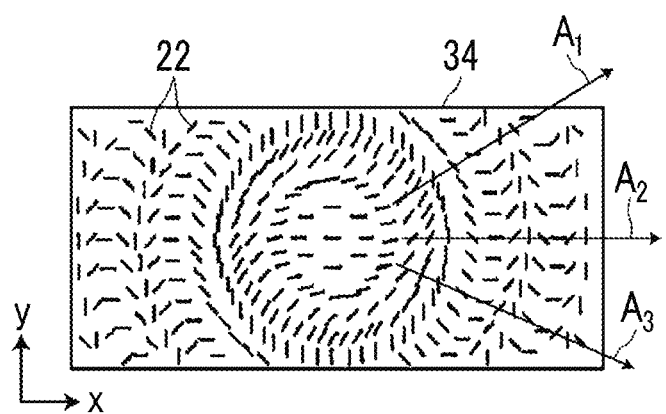
FIG. 6 is a schematic view illustrating a flat surface of a λ/2 plate in another alignment pattern of an optical axis.

FIG. 6 is a schematic view illustrating a flat surface of a λ/2 plate 34 in an example of changing the design of the optical element. The liquid crystal alignment pattern in the λ/2 plate 34 is different from the liquid crystal alignment pattern in the λ/2 plate 14 according to the above-described embodiment. FIG. 6 describes only the optical axis 22. The λ/2 plate 34 of FIG. 6 has a liquid crystal alignment pattern in which the orientation of the optical axis 22 changes while gradually rotating along multiple directions from the center side to the outside, for example, axes $A_1$, $A_2$, $A_3$, . . . , and the like. The absolute phase of incident light is changed based on different amounts of change in which the orientation of the optical axis 22 varies in each local region due to the liquid crystal alignment pattern illustrated in FIG. 6. In a case where the optical element comprises the liquid crystal alignment pattern in which the optical axis radially rotates and changes, light can be reflected as divergent light or focused light. In other words, the function as a concave lens or a convex lens can be realized by the liquid crystal alignment pattern in the λ/2 plate 34.

Such an optical element according to the embodiment of the present invention can be used as a light reflection element that reflects light in a direction different from the regular reflection direction or a microlens that focuses or diverges light by appropriately designing the liquid crystal alignment pattern in the λ/2 plate. Further, the optical element can be used as a reflection screen that diverges incident light.

In the embodiment, the configuration in which the λ/2 plate comprises the liquid crystal alignment pattern formed by aligning rod-like liquid crystals in a pattern form has been described. However, the λ/2 plate may comprise a liquid crystal alignment pattern formed by aligning disk-like liquid crystals in a pattern form in place of rod-like liquid crystals.

Figure 7:
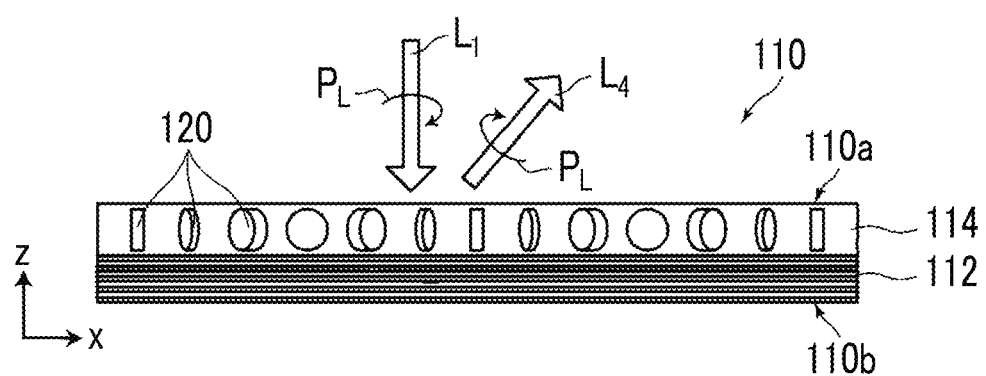
FIG. 7 is a schematic view illustrating a side surface an optical element according to a second embodiment.
Figure 8:
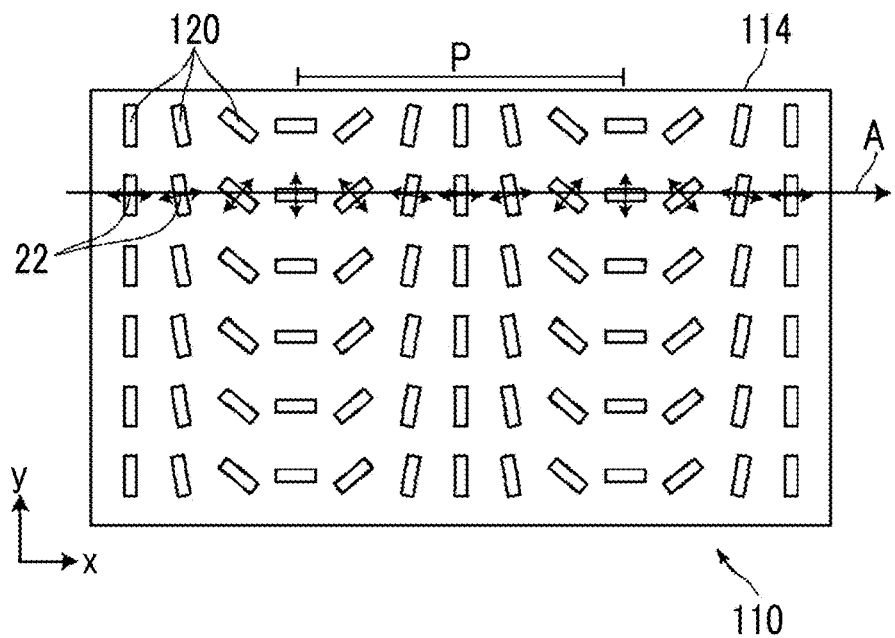
FIG. 8 is a schematic view illustrating a flat surface of the optical device according to the second embodiment.

FIG. 7 is a schematic view illustrating the configuration of a side surface of an optical element 110 according to a second embodiment of the present invention, and FIG. 8 is a schematic view illustrating the configuration of a flat surface of a λ/2 plate 114 of the optical element 110 illustrated in FIG. 7. Here, a sheet surface of the sheet-like optical element 110 is defined as an x-y surface, and the thickness direction is defined as a z direction.

The optical element 110 according to the second embodiment includes the wavelength selective reflective polarizer 12 and the λ/2 plate 114 comprised on at least one surface side of the reflective polarizer 12.

The reflective polarizer 12 is the same as the optical element 10 according to the first embodiment, but the λ/2 plate 114 is different from the λ/2 plate 14 of the optical element 10 according to the first embodiment and has a liquid crystal alignment pattern formed of a disk-like liquid crystal 120. An axis (fast axis) perpendicular to the disk surface of the disk-like liquid crystal 120 is the optical axis 22 in the disk-like liquid crystal.

As illustrated in FIG. 7 and FIG. 8, in the λ/2 plate of the optical element 110 according to the present embodiment, the disk-like liquid crystal 120 changes while continuously rotating in one direction (axis A) in a state in which the disk surface thereof stands in a direction perpendicular to the surface of the λ/2 plate 114. In other words, the λ/2 plate is fixed by the alignment pattern in which the angle between the disk-like liquid crystal 120 and the disk surface with respect to the axis A gradually changes. In this manner, the λ/2 plate (optically anisotropic layer) 114 and the optical axis 22 are aligned in parallel with the surface so that the alignment pattern in which the optical axis changes while continuously rotating in at least one direction (axis A) of the plane is realized.

Since the change of the optical axis 22 in the present optical element 110 is the same as in the case of the optical element 10 according to the first embodiment illustrated in FIG. 2, the same action as in the case of the optical element 10 occurs. Therefore, similar to the optical element 10 according to the first embodiment, the optical element 110 reflects light in a specific wavelength range that is circularly polarized light oriented in a direction opposite to that of the specific circularly polarized light among light to be incident on the surface of the optical element on the λ/2 plate 114 side in a direction different from the regular reflection direction. For example, in a case where the reflective polarizer 12 reflects right circularly polarized light $P_R$ that is light in a wavelength range of a green color, as illustrated in FIG. 7, light $L_1$ of left circularly polarized light $P_L$ is incident on the surface (the surface on the λ/2 plate 114 side) 110a of the optical element 110 from the normal direction, and green light $L_4$ of the left circularly polarized light $P_L$ is reflected in a direction different from the normal direction.

As described above, the same effect can be obtained even in a case where the liquid crystal alignment pattern in the λ/2 plate is an alignment pattern formed of rod-like liquid crystals or an alignment pattern formed of disk-like liquid crystals. As described above, the reflective polarizer 12 may be formed of any of a rod-like liquid crystal compound or a disk-like liquid crystal compound. The λ/2 plate and the reflective polarizer may be formed of the same liquid crystal compound, or one of the λ/2 plate and the reflective polarizer is formed of a rod-like liquid crystal compound and the other is formed of a disk-like liquid crystal compound. Further, one of the λ/2 plate and the reflective polarizer is formed of a rod-like liquid crystal compound and the other is formed of a disk-like liquid crystal compound. In this case, the λ/2 plate and the reflective polarizer work in a direction in which the retardation in the oblique direction is cancelled so that the retardation in the oblique direction becomes close to the retardation in the front direction, and thus the effective angle becomes widened, which is preferable.

Further, the optical element according to the embodiment of the present invention has the wavelength selective reflective polarizer and the λ/2 plate, but may also comprise other layers or supports. Further, the wavelength selective reflection polarizer and the λ/2 plate may be laminated with each other through an adhesive layer. Further, the optical element according to the embodiment of the present invention may be configured such that the wavelength selective reflective polarizer and the λ/2 plate are fixed by a holding member and disposed with a gap that does not cause interference between the wavelength selective reflective polarizer and the λ/2 plate, for example, a void of 0.1 μm or less.

In the optical element according to the embodiment of the present invention, left circularly polarized light opposite to specific circularly polarized light (here, referred to as right circularly polarized light) that is reflected by the reflective polarizer is converted to right circularly polarized light at the time of being initially incident on the λ/2 plate and passing therethrough, is incident on the reflective polarizer in a state in which the traveling direction is changed because the bending force generated due to the liquid crystal alignment pattern is applied, and then regularly reflected by the reflective polarizer. The light is incident in a direction opposite to the direction in a case of light being incident on the λ/2 plate while right circularly polarized light is maintained at the time of regular reflection by the reflective polarizer. In the λ/2 plate, the light is converted to left circularly polarized light, and the bending force generated by the liquid crystal alignment pattern acts in the same orientation as the orientation of the light incidence. In this manner, reflected light is emitted in a direction further inclined from the regular reflection direction of the incident light. In a case where the optical element comprises a reflection plate of the related art which is formed of a metal dielectric multilayer film or a metal film in place of the reflective polarizer, circularly polarized light to be incident on the reflection plate through the λ/2 plate becomes circularly polarized light oriented in a direction opposite to the direction at the time of regular reflection.

In a case where circularly polarized light whose polarization direction has been changed by the reflection plate is returned to the λ/2 plate, the bending force acts in a direction opposite to the direction at the time of the light incidence in the λ/2 plate. As the result, the incident light is reflected in the regular reflection direction. Therefore, in the configuration in which the optical element comprises a reflection plate of the related art which is formed of a metal dielectric multilayer film or a metal film, the effect in which light is reflected in a direction different from the regular reflection direction obtained by the optical element according to the embodiment of the present invention cannot be obtained.

As described above, the configuration in which the reflective polarizer comprises the λ/2 plate having in-plane anisotropy on only one surface side thereof has been described, but the reflective polarizer may comprise the λ/2 plate on both surfaces thereof.

Further, an optical element comprising a reflective polarizer with a different selective wavelength range may be used in combination. In the description above, the example in which incident light is incident in the regular direction has been described, but the same effect can be obtained in a case where the incident light is incident in an oblique direction. In general, in a case where the angle is deviated obliquely from the front, the angle of reflected light and the transmitted light is deviated by an amount corresponding to the deviated angle.

Hereinafter, the reflective polarizer and the λ/2 plate constituting the optical element according to the embodiment of the present invention will be described in detail.

[Reflective Polarizer]

The reflective polarizer comprises a cholesteric liquid crystal layer formed by fixing a cholesteric phase in which rod-like liquid crystals or disk-like liquid crystals are helically aligned. The cholesteric liquid crystal layer is formed of a cured layer of a polymerizable liquid crystal composition containing a rod-like liquid crystal compound or a disk-like liquid crystal compound. The pitch of this helical structure can be easily adjusted by changing the amount of a chiral agent to be added. The detailed description thereof is available in Fujifilm Research Report No. 50 (2005), p. 60 to 63. Further, the pitch of the helical structure can also be adjusted under conditions of the temperature, the illuminance, and the irradiation time at the time of fixing the cholesteric phase. The cholesteric liquid crystal layer formed of a cured layer of a polymerizable liquid crystal composition can be obtained by forming an alignment film on a support, coating the alignment film with the polymerizable liquid crystal composition, and curing the composition. Further, the cholesteric liquid crystal layer functions as a reflective polarizer, but a laminate integrally comprising a support and an alignment film is also referred to as a reflective polarizer in some cases. The present invention includes this aspect.

<Cholesteric Liquid Crystal Layer>

The polymerizable liquid crystal composition for forming a cholesteric liquid crystal layer contains a rod-like liquid crystal compound or a disk-like liquid crystal compound and a chiral agent and may further contain other components such as an alignment control agent, a polymerization initiator, and an alignment assistant.

—Rod-Like Liquid Crystal Compound—

Preferred examples of the rod-like liquid crystal compound include azomethines, azoxys, cyanobiphenyls, cyanophenyl esters, benzoic acid esters, cyclohexanecarboxylic acid phenyl esters, cyano-substituted phenyl pyrimidines, alkoxy-substituted phenyl pyrimidines, phenyl dioxanes, tolanes, and alkenyl cyclohexyl benzonitriles. Such low-molecular-weight liquid crystal molecules as well as high-molecular-weight liquid crystal molecules can also be used.

It is more preferable that the alignment of the rod-like liquid crystal compound is fixed by polymerization, and compounds described in Makromol. Chem., Vol. 190, p. 2255 (1989), Advanced Materials, Vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-H07-110469A), JP1999-080081A (JP-H11-080081A), and JP2001-328973A can be used as polymerizable rod-like liquid crystal compounds. Further, compounds described in JP1999-513019A (JP-H11-513019A and JP2007-279688A can be preferably used as the rod-like liquid crystal compounds.

—Disk-Like Liquid Crystal Compound—

Compounds described in JP2007-108732A and JP2010-244038A can be preferably used as disk-like liquid crystal compounds.

—Other Components—

Known materials can be used as other components such as a chiral agent, an alignment control agent, a polymerization initiator, and an alignment assistant.

—Solvent—

As a solvent of the composition for forming the cholesteric liquid crystal layer, an organic solvent is preferably used. Examples of the organic solvent include an amide (such as N,N-dimethylformamide), a sulfoxide (such as dimethyl sulfoxide), a heterocyclic compound (such as pyridine), a hydrocarbon (such as benzene or hexane), an alkyl halide (such as chloroform or dichloromethane), an ester (such as methyl acetate or butyl acetate), a ketone (such as acetone, methyl ethyl ketone, or cyclohexanone), and an ether (such as tetrahydrofuran or 1,2-dimethoxyethane). Among these, an alkyl halide and a ketone are preferable. A combination of two or more kinds of organic solvents may be used.

<Support>

As the support, a transparent support is preferable, and examples thereof include a polyacrylic resin film such as polymethyl methacrylate, a cellulose-based resin film such as cellulose triacetate, and a cycloolefin polymer-based resin [such as "ARTON" (trade name, manufactured by JSR Corporation) or "ZEONOR" (trade name, manufactured by Zeon Corporation)]. The support is not limited to a flexible film, and an inflexible substrate such as a glass substrate may be used.

<Alignment Layer for Forming Cholesteric Liquid Crystal Layer>

An alignment layer may be comprised on a surface of the support for forming a cholesteric liquid crystal layer. The alignment layer for forming a cholesteric liquid crystal layer can be provided by means of a rubbing treatment performed on an organic compound (preferably a polymer), oblique vapor deposition of an inorganic compound, and formation of a layer having microgrooves. Further, an alignment layer which is allowed to have an alignment function by imparting an electric field, imparting a magnetic field, or performing irradiation with light has been known. It is preferable that the alignment layer is formed by performing a rubbing treatment on a surface of a polymer film.

Depending on the kind of polymer used for the support, the support can function as the alignment film by performing the alignment treatment directly on the support (for example, a rubbing treatment) without providing the alignment film. Examples of such a support include polyethylene terephthalate (PET).

<Formation of Cholesteric Liquid Crystal Layer>

A coated film is formed by coating the alignment layer with the polymerizable liquid crystal composition.

The surface can be coated with the polymerizable liquid crystal composition according to a method of performing development using an appropriate system such as a roll coating system, a gravure printing system, or a spin coating system. The coating can be performed using various methods such as a wire bar coating method, an extrusion coating method, a direct gravure coating method, a reverse gravure coating method, and a die-coating method. Further, a coated film can be formed by jetting the liquid crystal composition from a nozzle using an ink jet device.

Thereafter, a cholesteric liquid crystal layer is obtained by aligning liquid crystals in the coated film on the cholesteric phase, curing the polymerizable liquid crystal composition, maintaining the alignment state, and fixing the state. The support and the alignment film may be peeled off after the cholesteric liquid crystal layer is formed.

[$\lambda/2$ Plate]

The $\lambda/2$ plate comprises an optically anisotropic layer formed by aligning rod-like liquid crystals or disk-like liquid crystals in the alignment pattern described above. The optically anisotropic layer is formed of a cured layer of a liquid crystal composition containing rod-like liquid crystals or disk-like liquid crystals. The optically anisotropic layer formed of the cured layer of the liquid crystal composition can be obtained by forming an alignment film on the support, coating the alignment film with the liquid crystal composition, and curing the composition. Further, the optically anisotropic layer functions as the $\lambda/2$ plate, but a laminate integrally comprising a support and an alignment film is also referred to as a $\lambda/2$ plate in some cases. The present invention includes this aspect. As the support, the same support comprised in the reflective polarizer can be used.

<Optically Anisotropic Layer>

The liquid crystal composition for forming an optically anisotropic layer contains a rod-like liquid crystal or a disk-like liquid crystal and may further contain other components such as a leveling agent, an alignment control agent, a polymerization initiator, and an alignment assistant.

As the rod-like liquid crystal and the disk-like liquid crystal, the rod-like liquid crystal compound and the disk-like liquid crystal compound used in the polymerizable liquid crystal composition for forming a cholesteric liquid crystal layer can be appropriately used. Further, it is desirable that the $\lambda/2$ plate has a broad band with respect to the wavelength and preferable to use a liquid crystal material in which the birefringence is reversely dispersed. Further, it is preferable that the broad band is substantially obtained by imparting a twisted component to the liquid crystal or laminating different phase difference layers. For example, a method of realizing a patterned $\lambda/2$ plate having a broad band by laminating two layers of liquid crystals whose twisted directions are different from each other is described in JP2014-089476A and can be preferably used in the embodiment of the present invention.

<Alignment Film for Forming Optically Anisotropic Layer>

Examples of the alignment film for forming an optically anisotropic layer include a rubbed film formed of an organic compound such as a polymer, an obliquely deposited film of an inorganic compound, a film having microgrooves, and a film obtained by accumulating LB films formed of an organic compound such as co-tricosanoic acid, dioctadecylmethylammonium chloride, or methyl stearate according to the Langmuir-Blodgett method. As the alignment film, an alignment film formed by applying a rubbing treatment to a surface of a polymer layer is preferable. The rubbing treatment is performed by rubbing the surface of the polymer layer several times in a certain direction using paper or cloth. As the kind of the polymer used for the alignment layer, polyimide, polyvinyl alcohol, polymers containing polymerizable groups described in JP1997-152509A (JP-H09-152509A), and orthogonal alignment films described in JP2005-097377A, JP2005-099228A, and JP2005-128503A can be preferably used. Further, the orthogonal alignment film in the present specification indicates an alignment film in which a major axis of a molecule in the polymerizable rod-like liquid crystal compound is aligned so as to be substantially orthogonal to the rubbing direction of the orthogonal alignment film. The thickness of the alignment layer is not necessarily large as long as the alignment function can be provided, and the thickness thereof is preferably in a range of 0.01 to 5 µm and more preferably in a range of 0.05 to 2 µm.

Further, a so-called photo-alignment film obtained by irradiating a photo-alignment material with polarized light or non-polarized light to obtain an alignment film can also be used. In other words, a photo-alignment film may be prepared by coating the support with a photo-alignment material. The photo-alignment film can be irradiated with polarized light in the vertical direction or oblique direction, and the photo-alignment film can be irradiated with non-polarized light in an oblique direction.

Preferred examples of the photo-alignment material used for the photo-alignment film which can be used in the embodiment of the present invention include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having photo-alignment units described in JP2002-265541A and JP2002-317013A, photo-crosslinking silane derivatives described in JP4205195B and JP4205198B, photo-crosslinked polyimides, polyamides, or esters described in JP2003-520878A, JP2004-529220A, and JP4162850B, and compounds capable of photodimerization, particularly cinnamate compounds, chalcone compounds, and coumarin compounds described in JP1997-118717A (JP-H09-118717A), JP1998-506420A (JP-H10-506420A), JP2003-505561A, WO2010/150748A, JP2013-177561A, JP2014-012823A. Among these, azo compounds, photo-crosslinking polyimides, polyamides, esters, cinnamate compounds, or chalcone compounds are preferable.

In the embodiment of the present invention, it is preferable to use a photo-alignment film.

Figure 9:
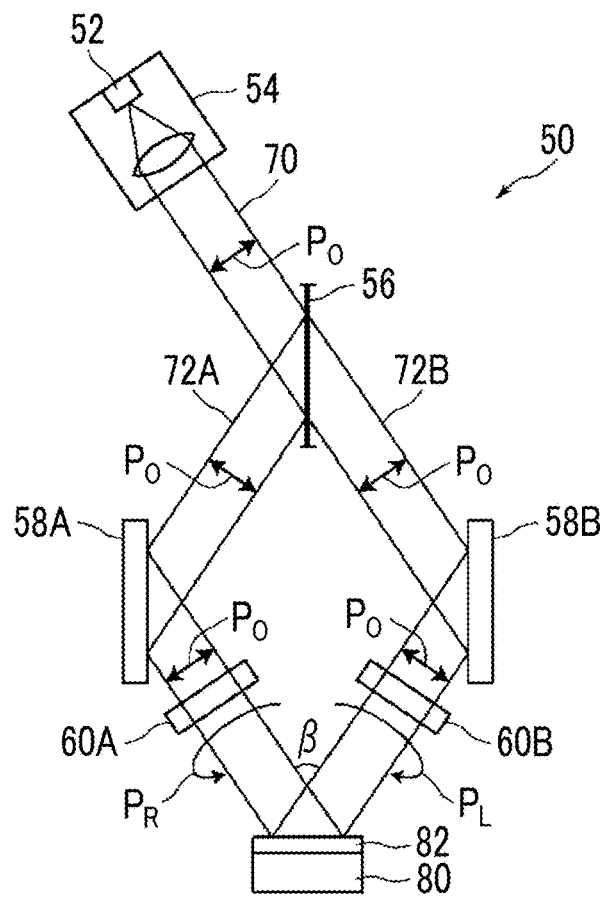
FIG. 9 is a schematic configuration view illustrating an exposure device that irradiates an alignment film with interference light.

The alignment pattern is formed by coating the support with the alignment film, drying the alignment film, and exposing the alignment film to a laser. FIG. 9 is a schematic view illustrating an exposure device for the alignment film. An exposure device 50 comprises a light source 52 comprising a semiconductor laser 54, a beam splitter 56 that separates laser light 70 from the semiconductor laser 52 into two light beams, mirrors 58A and 58B respectively disposed on optical paths of two light beams 72A and 72B, and λ/4 plates 60A and 60B. The λ/4 plates 60A and 60B each comprise an optical axis, and these optical axes are orthogonal to each other. The λ/4 plate 60A converts linearly polarized light Po to right circularly polarized light $P_R$, and the λ/4 plate 60B converts linearly polarized light Po to left circularly polarized light $P_L$.

A support 80 comprising an alignment film 82 is disposed in an exposed portion, two light beams 72A and 72B are allowed to intersect with each other on the alignment film 82 to interfere with each other, the alignment film 82 is irradiated with interference light so as to be exposed to the light. Due to this interference, the polarization state of light to be applied to the alignment film 82 periodically changes in the form of interference fringes. In this manner, an alignment pattern in which the alignment state periodically changes is obtained. In the exposure device 50, the pitch of the alignment pattern can be changed by changing a crossing angle β between two light beams 72A and 72B. An optically anisotropic layer comprising a liquid crystal alignment pattern according to this period can be formed by forming the following optically anisotropic layer on the alignment film having an alignment pattern whose alignment state periodically changes.

<Formation of Optically Anisotropic Layer>

The optically anisotropic layer is formed by multilayer-coating the alignment film with the liquid crystal composition. The multilayer-coating is performed by coating the alignment film with the liquid crystal composition, heating the composition, cooling the composition, and curing the composition with ultraviolet rays to prepare the first liquid crystal immobilization layer. The second and subsequent liquid crystal immobilization layers are obtained by repeating the processes, such as coating the liquid crystal immobilization layer with the composition through overcoating, heating the composition, cooling the composition, and curing the composition using ultraviolet rays. By forming the optically anisotropic layer through multilayer-coating, the alignment direction of the alignment film can be reflected from the lower surface to the upper surface of the optically anisotropic layer even in a case where the total thickness of the optically anisotropic layer increases.

Further, an optical element formed by laminating the reflective polarizer and the λ/2 plate can be obtained by bonding the reflective polarizer and the λ/2 plate obtained in the above-described manner through an adhesive layer.

Examples of the pressure sensitive adhesive used for an adhesive layer include a polyester-based resin, an epoxy-based resin, a polyurethane-based resin, a silicone-based resin, and an acrylic resin. These may be used alone or in the form of a mixture of two or more kinds thereof. From the viewpoint that the water resistance, the heat resistance, and the light fastness are reliable and excellent, the adhesiveness and the transparency are excellent, and the refractive index is easily adjusted to be suitable for a liquid crystal display, the acrylic resin is preferable.

Figure 10:
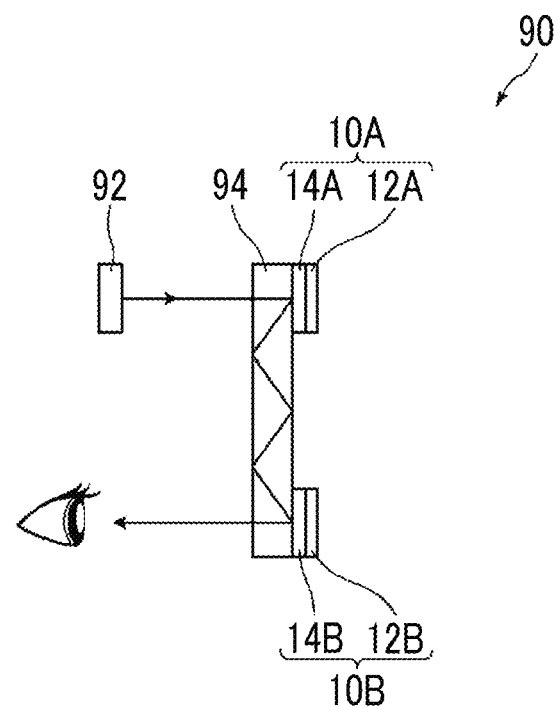
FIG. 10 is a schematic configuration view illustrating a head mounted display which is an example of an optical device.

Next, an example of an optical device comprising the optical element according to the embodiment of the present invention will be described. FIG. 10 is a view illustrating the configuration of main portions of a head mounted display 90 which is an example of the optical device.

As illustrated in FIG. 10, the head mounted display 90 comprises a liquid crystal display device 92 which is an embodiment of a light source, and a light guide member 94 which guides light output from the liquid crystal display device 92 and also comprises optical elements 10A and 10B according to the embodiment of the present invention in a portion of the light guide member 94. The liquid crystal display device 92 and the light guide member 94 are disposed such that the light from the liquid crystal display device 92 is perpendicularly incident on the light guide member 94 and disposed at a position where the light which has been incident on the light guide member 94 by the optical element 10A is perpendicularly incident on the surface of the optical element 10A. In addition, the optical element 10B is disposed at a position where the light guided by being totally reflected by the light guide member 94 is incident.

The optical element 10A comprises a reflective polarizer 12A and a λ/2 plate 14A and is configured such that light to be perpendicularly incident on the λ/2 plate 14A is reflected in an oblique direction. The optical element 10B comprises a reflective polarizer 12B and a λ/2 plate 14B and is configured such that light to be incident on the λ/2 plate 14B in an oblique direction is reflected in the vertical direction.

As described above, in a case where the optical element according to the embodiment of the present invention is used, since the reflection direction of incident light can be set as a desired direction and it is not necessary to separately provide a reflection element and an element for changing an optical path, the size of the optical device can be reduced.

EXAMPLES

Hereinafter, the optical element of the embodiment of the present invention will be described based on examples and comparative examples.

Examples 1 to 4

A λ/2 plate and a reflective polarizer were respectively formed on a support or a substrate and bonded to each other to prepare an optical element. In Examples 1 to 4, the 180° rotation pitches of the λ/2 plate are different from one another.

[Preparation of λ/2 Plate]

(Saponification of Support)

A commercially available triacetyl cellulose film "Z-TAC" (manufactured by Fujifilm Corporation) was used as the support. The support was allowed to pass through a dielectric heating roll having a temperature of 60° C., and the surface temperature of the support was increased to 40° C. Thereafter, one surface of the support was coated with an alkali solution described below with a coating amount of 14 mL/m$^2$ using a bar coater, and the support was heated to 110° C. and transported under a steam type far infrared heater (manufactured by Noritake Co., Ltd.) for 10 seconds. Next, the surface of the support was coated with 3 mL/m$^2$ of pure water using the same bar coater. Next, the support was washed with water using a fountain coater and drained using an air knife three times, a drying zone at 70° C. was transported for 10 seconds so that the support was dried, thereby obtaining an alkali-saponified support.

<Alkali Solution>

| | |
|---|---|
| Potassium hydroxide | 4.70 parts by mass |
| Water | 15.80 parts by mass |
| Isopropanol | 63.70 parts by mass |
| Surfactant | parts by mass |
| SF-1: $C_{14}H_{29}O(CH_2CH_2O)_2OH$ | 1.0 parts by mass |
| Propylene glycol | 14.8 parts by mass |

(Formation of Undercoat Layer)

The alkali-saponified support was continuously coated with the following coating solution for forming an undercoat layer using a #8 wire bar. The support on which the coated film was formed was dried with hot air at 60° C. for 60 seconds and further dried with hot air at 100° C. for 120 seconds, thereby forming an undercoat layer.

<Coating Solution for Forming Undercoat Layer>

| | |
|---|---|
| Modified polyvinyl alcohol shown below | 2.40 parts by mass |
| Isopropyl alcohol | 1.60 parts by mass |
| Methanol | 36.00 parts by mass |
| Water | 60.00 parts by mass |

Modified polyvinyl alcohol

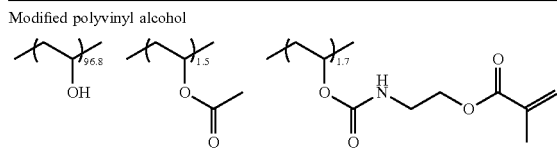

(Formation of Alignment Film P-1)

The support on which the above-described undercoat layer was formed was continuously coated with the following coating solution for forming an alignment film P-1 using a #2 wire bar. The support on which the coated film formed of the coating solution for forming the alignment film P-1 was formed was dried with hot air at 60° C. for 60, thereby forming an alignment film P-1.

<Coating Solution for Forming Alignment Film P-1>

| | |
|---|---|
| Material for photo-alignment shown below | 1.00 parts by mass |
| Water | 16.00 parts by mass |
| Butoxy ethanol | 42.00 parts by mass |
| Propylene glycol monomethyl ether | 42.00 parts by mass |

Material for photo-alignment

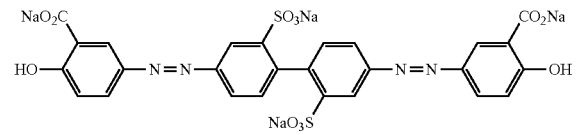

(Exposure of Alignment Film P-1)

The alignment film was exposed using the exposure device 50 illustrated in FIG. 9. An exposure device emitting laser light having a wavelength (405 nm) as semiconductor layer 52 was used as the exposure device 50. The amount of exposure to interference light was set to 100 mJ/cm$^2$. Further, the 180° rotation pitch of a pattern to be formed by the interference between two laser light beams was controlled by changing a crossing angle β between two light beams.

(Formation of Optically Anisotropic Layer A-1)

A layer formed of reverse dispersion liquid crystals was formed as an optically anisotropic layer. The optically anisotropic layer was formed by multilayer-coating the alignment film P-1 with the following composition A-1. The multilayer-coating was performed by coating the alignment film with the first composition A-1, heating the composition, cooling the composition, and curing the composition with ultraviolet rays to prepare the liquid crystal immobilization layer. The second and subsequent liquid crystal immobilization layers were obtained by repeating the processes, such as coating the liquid crystal immobilization layer with the composition through overcoating, heating the composition, cooling the composition, and curing the composition using ultraviolet rays. By forming the optically anisotropic layer through multilayer-coating, the alignment direction of the alignment film can be reflected from the lower surface to the upper surface of the liquid crystal layer even in a case where the total thickness of the liquid crystal layer increases.

First, as the first layer, the coated film obtained by coating the alignment film P-1 with the following composition A-1 was heated on a hot plate at 110° C. and then cooled to 60° C., and the coated film was irradiated with ultraviolet rays having a wavelength of 365 nm at an irradiation dose of 100 mJ/cm$^2$ using a high pressure mercury lamp in a nitrogen atmosphere, thereby immobilizing the orientation of the liquid crystal compound. The film thickness of a single layer of the liquid crystal layer at this time was 0.2 μm.

The second and subsequent liquid crystal immobilization layers were prepared by coating the liquid crystal layer through overcoating, heating the layer under the same conditions as described above, cooling the layer, and curing the layer with ultraviolet rays. In this manner, an optically anisotropic layer A-1 was obtained by repeating the overcoating until the total thickness reached a desired film thickness. Finally, it was confirmed that the birefringence of the liquid crystal was 275 nm (=λ/2) and the surface was periodically aligned using a polarizing microscope.

<Composition A-1>

| | |
|---|---|
| Liquid crystal compound L-1 shown below | 42.00 parts by mass |
| Liquid crystal compound L-2 shown below | 42.00 parts by mass |
| Liquid crystal compound L-3 shown below | 16.00 parts by mass |
| Polymerization initiator PI-1 shown below | 0.50 parts by mass |
| Leveling agent T-1 shown below | 0.50 parts by mass |
| Methyl ethyl ketone | 176.00 parts by mass |
| Cyclopentanone | 44.00 parts by mass |

Liquid crystal compound L-1

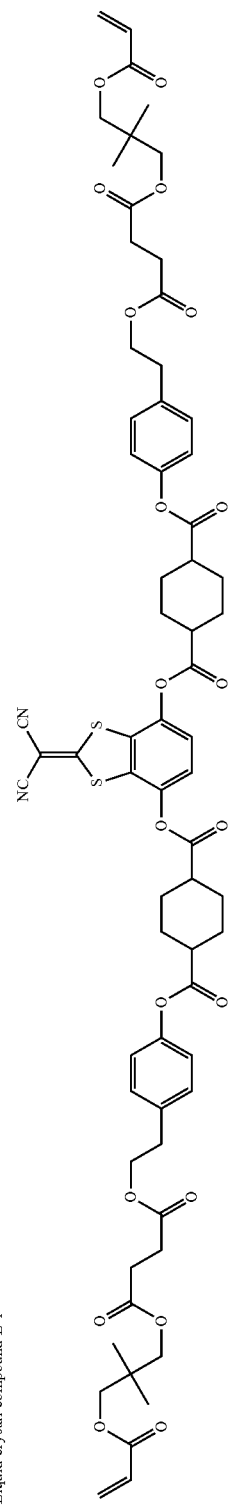

Liquid crystal compound L-2

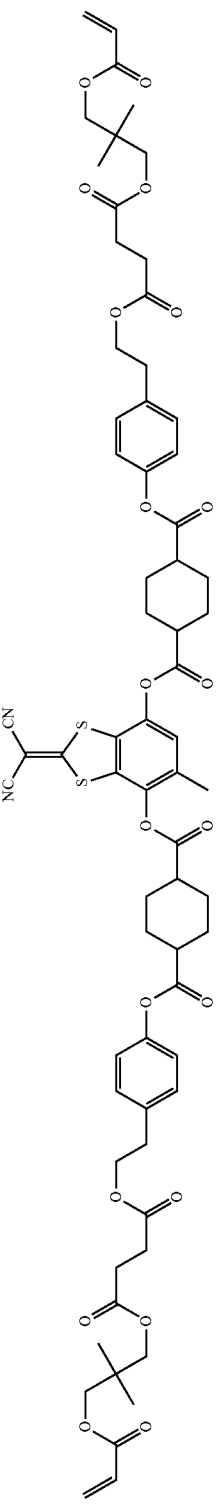

Liquid crystal compound L-3

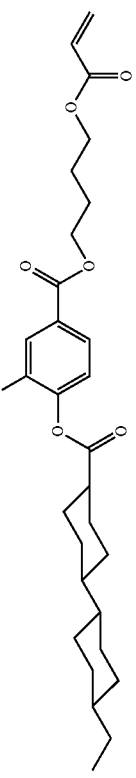

-continued
Polymerization initiator PI-1
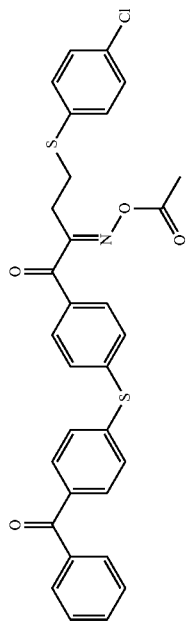
Leveling agent T-1
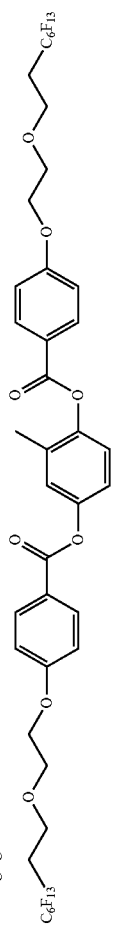

[Preparation of Reflective Polarizer]
(Formation of Alignment Layer)

The components of the composition A for forming an alignment layer shown below were stirred in a container whose temperature was maintained at 80° C. and dissolved, thereby preparing the composition A for forming an alignment layer.

<Composition a for Forming Alignment Layer>

| | |
|---|---|
| Pure water | 97.2 parts by mass |
| PVA-205 (manufactured by Kuraray Co., Ltd.) | 2.8 parts by mass |

A glass substrate was uniformly coated with the composition A for forming an alignment layer prepared in the above-described manner using a slit coater, and the coated film was dried in an oven at 100° C. for 2 minutes, thereby obtaining a glass substrate provided with an alignment layer having a film thickness of 0.5 μm.

(Formation of Reflective Polarizer (Cholesteric Liquid Crystal Layer))

The components of the cholesteric liquid crystal composition Gm shown below were stirred in a container whose temperature was maintained at 25° C. and dissolved, thereby preparing the cholesteric liquid crystal composition Gm.

<Cholesteric Liquid Crystal Composition Gm>

The cholesteric liquid crystal composition Gm is a material that forms a layer reflecting right circularly polarized light having a center wavelength of 550 nm in a case where light was incident and reflected from the vertical direction.

A reflective polarizer formed of a cholesteric liquid crystal layer with a film thickness of 2 μm was formed by performing a rubbing treatment on the surface of the alignment film of the glass substrate provided with the alignment film prepared in the above-described manner, uniformly coating the surface with the cholesteric liquid crystal composition Gm prepared in the above-described manner using a slit coater, drying the coated film at 95° C. for 30 seconds, irradiating the film with ultraviolet rays with an irradiation dose of 500 mJ/cm² at room temperature using an ultraviolet irradiation device, and curing the film.

(Lamination Method)

The reflective polarizer prepared in the above-described manner and the λ/2 plate were bonded using SK Dyne (registered trademark) (manufactured by Soken Chemical & Engineering Co., Ltd.).

Example 5

An optically anisotropic layer formed of forward dispersed liquid crystals was formed by changing the optically

| | |
|---|---|
| Methoxy ethyl acrylate | 145.0 parts by mass |
| Liquid crystal compound L-4 shown below | 100.0 parts by mass |
| IRGACURE 819 (manufactured by BASF SE) | 10.0 parts by mass |
| Chiral agent A having structure shown below | 5.78 parts by mass |
| Surfactant having structure shown below | 0.08 parts by mass |

Liquid crystal compound L-4

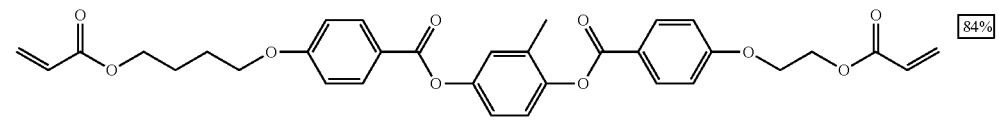

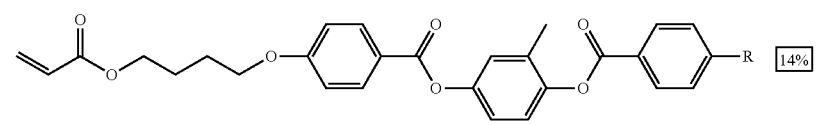

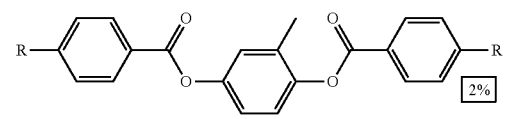

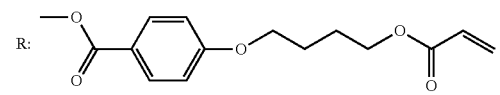

Chiral agent A

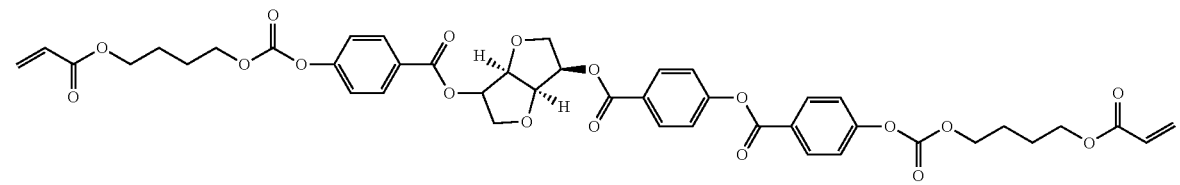 [SMILES: C=CC(=O)OCCCCOC(=O)Oc1ccc(C(=O)Oc2ccc(C(=O)O[C@@H]3CO[C@@H]4C(OC(=O)c5ccc(OC(=O)OCCCCOC(=O)C=C)cc5)CO[C@@H]43)cc2)cc1]

Surfactant

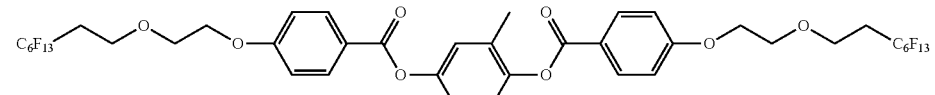

anisotropic layer A-1 to the optically anisotropic layer A-2 in the method of preparing the λ/2 plate of Example 1.

The following composition A-2 was used in place of the composition A-1 in the preparation step of Example 1. The composition A-2 was formed by being applied onto the alignment film P-1 through multilayer-coating. The multilayer-coating method was the same as in Example 1 except that the heating temperature on a hot plate was set to 90° C.

<Composition A-2>

| | |
|---|---|
| Liquid crystal compound L-4 shown above | 100.00 parts by mass |
| Polymerization initiator (Irgacure (registered trademark) 907, manufactured by BASF SE) | 3.00 parts by mass |
| Photosensitizer (KAYACURE DETX-S, manufactured by Nippon Kayaku Co., Ltd.) | 1.00 parts by mass |
| Leveling agent T-1 | 0.50 parts by mass |
| Methyl ethyl ketone | 211.00 parts by mass |

Comparative Example 1

For comparison, an optical element formed of only a reflective polarizer that did not comprise a λ/2 plate was used in Comparative Example 1.

Comparative Example 2

A half mirror PSCH-25.4C03-10-550 (product number) (manufactured by Sigmakoki Co., Ltd.) was used in place of the reflective polarizer.

The same λ/2 plate as in Example 2 was bonded to the half mirror to obtain an optical element of Comparative Example 2.

[Evaluation]

Light was allowed to be incident on the surface of each optical element on the λ/2 plate side from the normal direction (polar angle of 0°) of the surface, and the reflection angle of the reflected light was measured. At this time, the reflection angle was calculated by allowing laser light having an output center wavelength of 550 nm to be incident on the surface of the optical element along the normal direction from the position separated by 50 cm in the normal direction and capturing the spot of the reflected light using a screen disposed at a distance of 50 cm from the surface of the optical element. The measurement was performed in air.

The configurations and the evaluation results of each example are collectively listed in Table 1.

As listed in Table 1, incident light was regularly reflected in a case of using only the reflective polarizer of Comparative Example 1 and a case of the optical element comprising a half mirror in place of the reflective polarizer of Comparative Example 2. In Examples 1 to 5 of the present invention, reflected light was detected in a direction different from the direction of regular reflection with respect to incident light, and the effects of the present invention were apparent. Further, a large reflection angle was obtained as the 180° rotation pitch was smaller.

As described above, it has become possible to exhibit a special effect of obliquely reflecting incident light to be incident from the normal direction by combining the λ/2 plate having in-plane anisotropy and the reflective polarizer formed of a cholesteric liquid crystal layer. The above-described effect was not able to be obtained in a case where a reflection plate of the related art, formed of a metal dielectric multilayer film or a metal film such as a half mirror used in Comparative Example 2, was used in place of the reflective polarizer formed of a cholesteric liquid crystal layer.

The entire content of the disclosure of JP No. 2017-100265 filed on May 19, 2017 is incorporated herein by reference.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. An optical element comprising:
   a wavelength selective reflective polarizer which selectively reflects specific circularly polarized light that is light in a specific wavelength range; and
   a λ/2 plate which is disposed on at least one surface side of the wavelength selective reflective polarizer,
   wherein the λ/2 plate includes an optically anisotropic layer which has an optical axis in a direction parallel to a surface and is formed of a cured layer of a liquid crystal composition and has a liquid crystal alignment pattern in which an orientation of the optical axis changes while continuously rotating in at least one direction in a plane of the optically anisotropic layer, and
   light in the specific wavelength range which is circularly polarized light oriented in a direction opposite to that of the specific circularly polarized light among light incident on a surface of the optical element on the λ/2 plate side is reflected in a direction different from a regular reflection direction of the incident light.

TABLE 1

| | | | Example 1 | Example 2 | Example 3 | Example 4 | Example 5 | Comparative Example 1 | Comparative Example 2 |
|---|---|---|---|---|---|---|---|---|---|
| Configuration | Reflective polarizer | Reflection center wavelength (nm) | 550 | 550 | 550 | 550 | 550 | 550 | Half mirror |
| | | Helical pitch (μm) | 0.355 | 0.355 | 0.355 | 0.355 | 0.355 | 0.355 | |
| | λ/2 plate | Liquid crystal | A-1 | A-1 | A-1 | A-1 | A-2 | — | A-1 |
| | | Film thickness (μm) | 1.375 | 1.375 | 1.375 | 1.375 | 1.375 | — | 1.375 |
| | | 180° rotation pitch (μm) | 44 | 4 | 2 | 1 | 1 | — | 4 |
| Effect | | Reflection angle (°) with respect to incident light angle of 0° (measured in air) | 1 | 16 | 32 | 67 | 67 | 0 | 0 |

2. The optical element according to claim 1,
   wherein a 180° rotation pitch of the orientation of the optical axis of the λ/2 plate in the one direction is 1 μm or greater and 45 μm or less.

3. The optical element according to claim 1,
wherein the wavelength selective reflective polarizer comprises a cholesteric liquid crystal layer.

4. The optical element according to claim 2,
wherein the wavelength selective reflective polarizer comprises a cholesteric liquid crystal layer.

5. The optical element according to claim 3,
wherein the cholesteric liquid crystal layer is formed of a cured layer of a polymerizable liquid crystal composition containing a rod-like liquid crystal compound.

6. The optical element according to claim 4,
wherein the cholesteric liquid crystal layer is formed of a cured layer of a polymerizable liquid crystal composition containing a rod-like liquid crystal compound.

7. The optical element according to claim 1,
wherein the liquid crystal alignment pattern in the $\lambda/2$ plate is formed by aligning rod-like liquid crystals in a pattern form.

8. An optical device comprising:
the optical element according to claim 1; and
a light source which allows light to be incident on the surface of the optical element on the $\lambda/2$ plate side.

* * * * *